Aug. 22, 1967　　　　　P. C. KOHL ETAL　　　　　3,337,023
　　　　　　　LIMITED LINE-PRESSURE BUFFER CONVEYOR
Filed April 28, 1966　　SYSTEM FOR DELICATE ARTICLES
　　　　　　　　　　　　　　　　　　　2 Sheets-Sheet 1

INVENTOR.
PETER C. KOHL
JEAN E. MOULDER
BY
Robertson, Bryan, Parmelee & Johnson
ATTORNEYS.

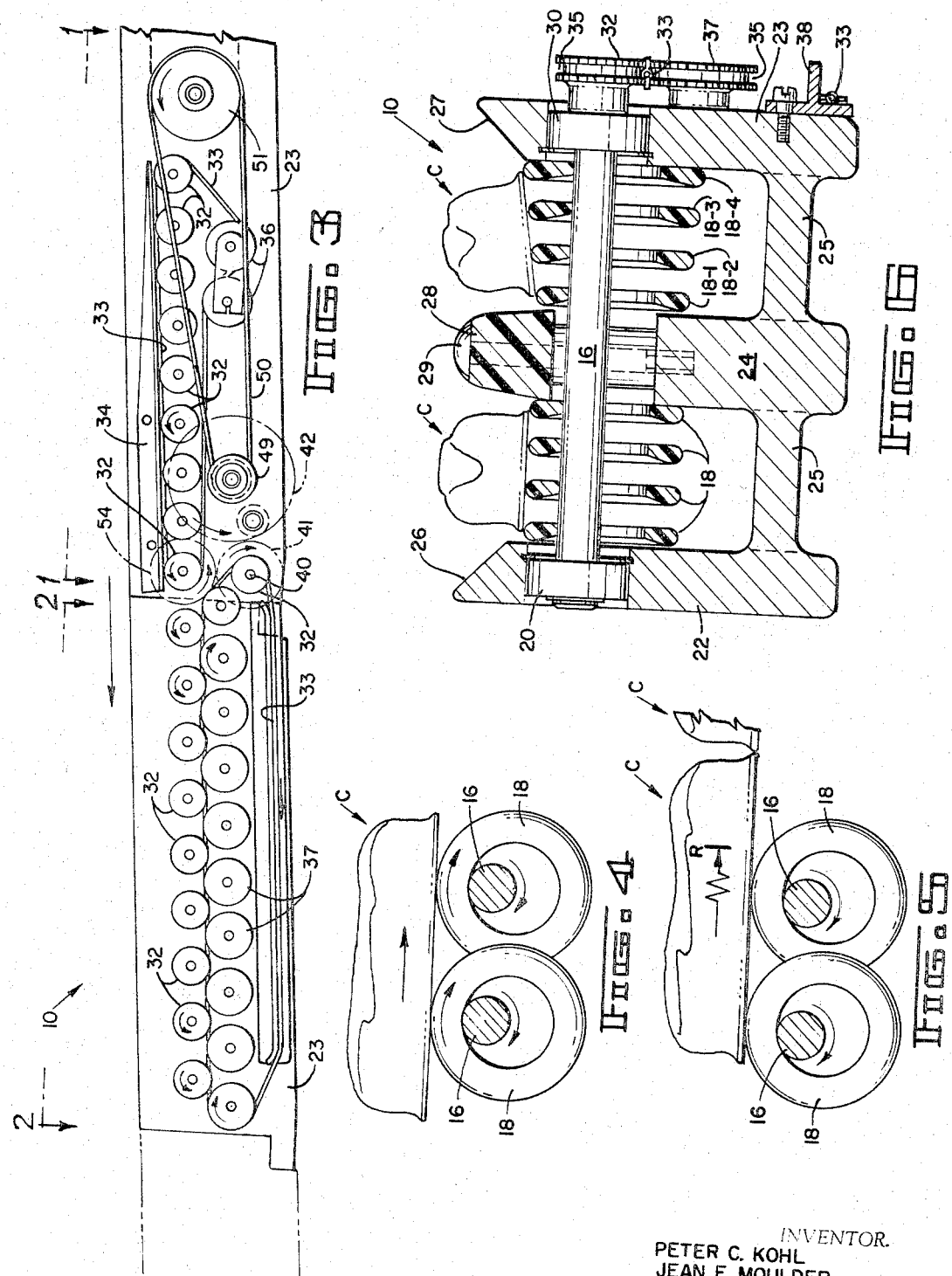

United States Patent Office 3,337,023
Patented Aug. 22, 1967

3,337,023
LIMITED LINE-PRESSURE BUFFER CONVEYOR SYSTEM FOR DELICATE ARTICLES
Peter C. Kohl, Darien, and Jean E. Moulder, Huntington, Conn., assignors to AEL Food Automation, Inc., Stamford Conn., a corporation of Connecticut
Filed Apr. 28, 1966, Ser. No. 546,057
9 Claims. (Cl. 198—127)

ABSTRACT OF THE DISCLOSURE

This invention relates to a limited line-pressure buffer conveyor system for delicate articles and more particularly to such a system for conveying and accumulating delicate articles, providing for matching of various upstream supply feed conditions with various downstream demand feed conditions, while protecting the confections from undue line pressure and from scuffing. The conveyor system includes a plurality of rotatable shafts having rings surrounding the shafts as seen in FIGURE 4. When the articles bank up as seen in FIGURE 5, the shafts continue to rotate but the rings become stationary so that the shafts slide against the stationary rings, thus avoiding scuffing of the confections, and accumulation of line pressure is minimized within the line of confections. The conveyor automatically stops as far upstream as the bank happens to extend at that instant, and beyond that point it continues running. The outside diameters (O.D.) of certain rings may be larger than the O.D. of others as seen in FIGURE 6 to provide a faster peripheral speed for steering the articles. The rings may taper inwardly as seen in FIGURE 6 to aid in making them self-cleaning.

Summary

In the manufacture, handling and packaging of delicate articles there are various applications in which the articles are conveyed from a preceding or upstream processing station to a subsequent or downstream processing station for further steps to be performed on the articles. For example the articles may be supplied one at a time from a finishing station located at the upstream end of the conveyor to be delivered in response to the demand of a packaging station located at the downstream end of the conveyor. In certain cases the preceding or upstream station supplies the delicate articles one at a time at regular time spacing, that is, in a cyclic pattern. In other cases the cyclic pattern is interrupted from time to time, such as a brief shut down for reloading, and sometimes the articles are supplied with an irregular time spacing. This irregular supply timing may result from statistical variations or control functions causing fluctuations in supply or by superpositions of both these effects in the upstream machinery.

Thus, there are generally three different types of supply conditions which may be present at the upstream conveyor end. These are: (1) cyclic supply without interruption, (2) cyclic supply with interruptions and (3) irregular or random supply. Similarly, at the downstream conveyor end the same three different types of demand conditions may be present.

To assure that the downstream station can continue in operation without interruption, the conveyor should be capable of delivering and accumulating slightly more articles per minute than will be utilized downstream. This excess capacity assures that there are always articles in readiness waiting at the input to the downstream station, regardless of any momentary interruptions or irregularities in output from the preceding station. A line of articles is accumulated at the delivery end of the conveyor adjacent to the input to the next station, that is, the articles are "banked up" in a temporary storage bank in readiness for the next station.

Prior to the present invention attempts have been made to provide conveyor systems extending between upstream and downstream stations having various characteristics. One prior system employs a sequence of individual conveyors to create a temporary storage bank and each of which is controlled in response to the number of articles which are lined up in the bank. This arrangement is complex and requires a sophisticated sensing and control system which is costly and introduces problems of adjustment and maintenance, and is fundamentally different in concept and operation from the present invention as will become apparent.

The field of the present invention is delicate articles such as confections, including chocolate bars, candies, sweetmeats, nut bars, cookies, and the like which must be protected from damage or marring so as to preserve their attractive appearance for distribution and sale. One prior arrangement in the confection field utilized a conveyor belt coated with a slippery plastic material. The conveyor belt was continuously running and the confections were banked by stopping the leading confection in the line and allowing the others to accumulate behind the leading one. This prior arrangement scuffed the bottom surfaces of the confections because the conveyor belt continued to slide beneath them when they were lined up in the temporary storage bank. Also, the forces developed in the line were cumulative so that the leading confection tended to be compressed by those behind it, and the confections tended to jam together or wedge together between the side walls along the storage line. This pressure caused marks on the confections, and made difficult the handling of the leading one. When it was removed from the line, the line would occasionally buckle up at the downstream end, or the confections were wedged together between the side walls such that they did not move forward promptly after the leading one had been removed. Also, the line tended to buckle upward in the center as a result of the cumulative pressure. The addition of a top plate prevented the buckling up but marred the top surfaces of the articles and introduced additional problems of wedging up against the top plate.

Among the advantages of the limited line-pressure buffer conveyor system for delicate articles of the present invention are those resulting from the fact that it provides for matching any of the above three supply conditions with any of the three demand conditions, that is, matching between any one of nine possible supply/demand relationships. Moreover, the articles are protected from scuffing, and from accumulated line pressure and if desired the articles can be banked and fed along a curved path.

In accordance with the invention the confections are conveyed forward by rolling upon a multiplicity of individual rings. Each of the rings surrounds an individual friction drive shaft in rolling engagement with its shaft, and drive means rotates all of the shafts for frictionally driving the rings. This forward driving condition is illustrated in FIGURE 4 in which C is a confection, such as a chocolate candy bar, being rolled forward by the rings 18, which are driven by the rotating shafts 16. When the confections bank up so that they encounter a resisting force R to their forward propagation, the shafts 16 continue to turn but the rings 18 become stationary so that the shafts slide against the stationary rings. This banked up condition is shown in FIGURE 5. As a result scuffing of the confections is avoided and accumulation of line pressure is minimized. The conveyor automatically stops as far upstream as the bank happens to extend at that instant, and beyond that point it continues running. The cofficient of sliding friction between the shaft and the ring is enabled to be chosen as desired by selecting the materials of the ring and shaft and in this example is very low. Also, the driving engagement location between the shaft and ring is positioned at a smaller radius than the location of the engagement between the ring and the confection. Therefore, the magnitude of the forward force on the confection becomes very small once the shaft has begun to slide, because the friction drive shaft is at a mechanical disadvantage relative to the confection being propagated.

In order to fulfill any need in the demand (downstream) end of the conveyor a buffer bank of temporarily stored articles is created on the conveyor rings. The conveyor operates to keep filling the upstream end of the temporary storage bank regardless of the occurrences at the downstream end of the bank, and the articles are withdrawn from the downstream end of the bank as they are needed. When it is time for the bank of confections to advance, each one is propagated ahead on its own account rather than being pushed ahead by those behind it. Moreover, the forward motion of each confection commences at the instant that the preceding confection starts to move, providing an effectively instantaneous starting action.

In this specification and in the accompanying drawings are described and shown a ring conveyor system for protecting delicate confections, the illustrative embodiment as shown being the best mode now contemplated by us for carrying out the invention. It is to be understood that this illustration is not intended to be exhaustive nor limiting of the invention but on the contrary is given so that those skilled in the art will fully understand the invention and will appreciate how the examples as described can be adapted and modified to meet the conditions of a particular application.

The various objects, aspects and advantages of the present invention will be more fully understood from a consideration of the following description in conjunction with the accompanying drawings.

*Description of the invention*

Figures 1, 2:
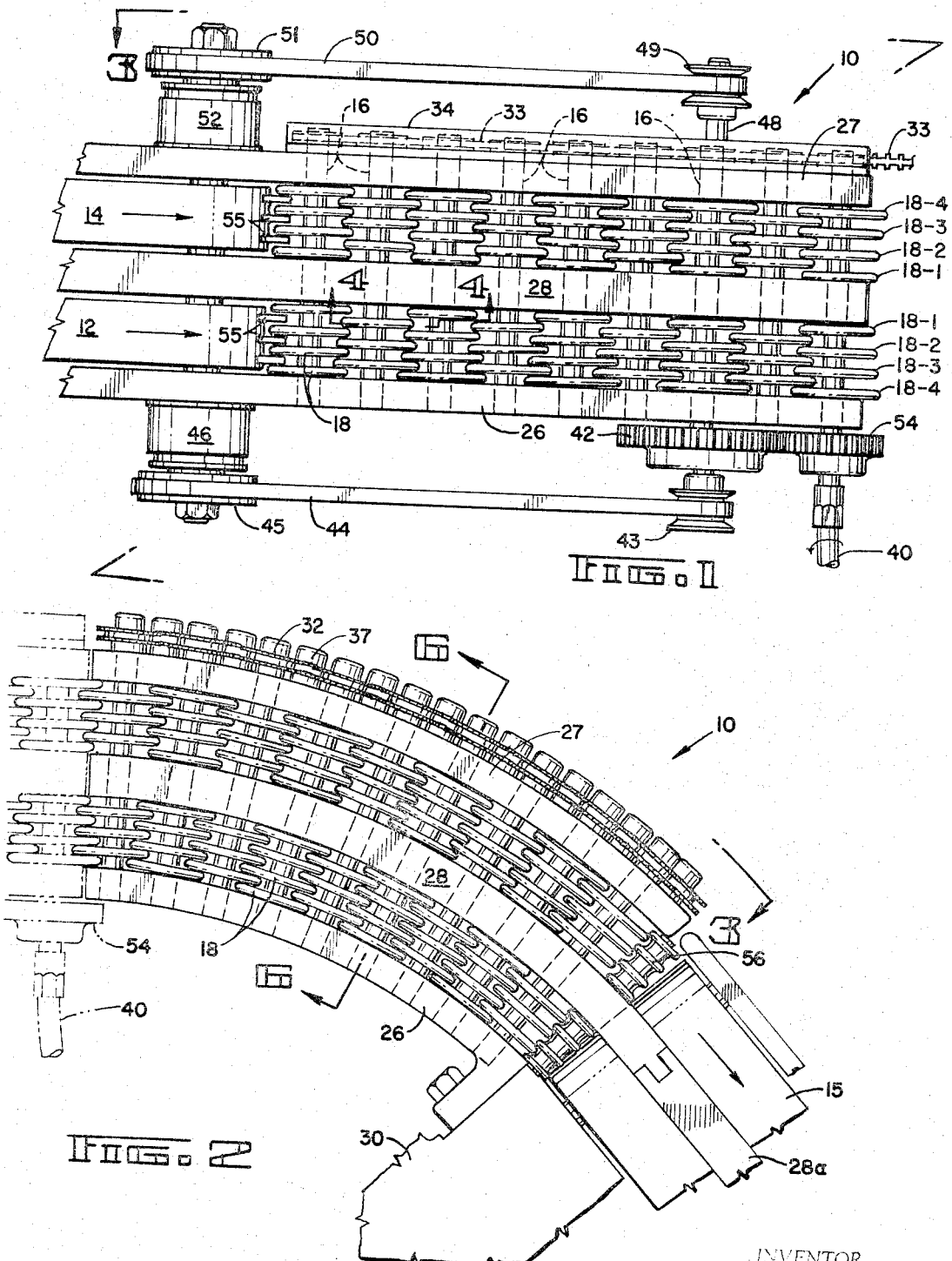
FIGURE 1 is a plan view of a section of a ring conveyor embodying the present invention for conveying delicate articles such as confections as seen from the position 1—1 in FIGURE 3.
FIGURE 2 is a plan view of a second section of the ring conveyor immediately following the section shown in FIGURE 1 as seen from the position 2—2 in FIGURE 3.

FIGURE 3 is a developed elevational view of the conveyor of FIGURES 1 and 2 as taken along the composite line 3—3 in FIGURES 1 and 2 and shown on slightly reduced scale;

FIGURE 4 is a partial sectional view taken along the line 4—4 in FIGURE 1 showing the dynamic action;

FIGURE 5 is a view similar to FIGURE 4 and showing the effective operation when a line of the confections is banked up; and FIGURE 6 is a cross sectional view taken along the line 6—6 in FIGURE 2.

Referring to the drawings in greater detail, the illustrative embodiment of the invention is a limited line-pressure buffer conveyor system 10 adapted to propagate delicate articles C, such as confections, forward from an upstream manufacturing station to a downstream packaging machine. In this particular example the packaging machine wraps two confections C together to make one package and so the conveyor system 10 is duplex for conveying them along two paths extending in side-by-side relationship. The confections C are supplied by a pair of upstream supply belts 12, 14 and are fed by conveyor system 10 over onto a downstream bank delivery belt 15.

The conveyor system 10 includes a multiplicity of rotating friction drive shafts 16 each carrying several rotatable friction substitution rings 18. As shown in FIGURE 6, the friction drive shafts 16 are mounted in bearings 20 and 30 which are secured in side frame guide members 22 and 23, respectively. There is a common center frame guide member 24 which is rigidly secured by braces 25 to the frame members 22 and 23, with openings extending down between the braces 25 as indicated by the vertical dotted lines. The rings 18 are effectively guided to remain in planes substantially perpendicular to their respective shafts 16. This guiding of the rings occurs by the fact that they are nested together with each one overlapping the adjacent upstream and downstream rings in an interleaved relationship and by the guidance of the frames 22, 23 and 24. Guide rails 26 and 27 for the confections are formed by the upper edges of the frames 22 and 23. A common guide 28 of slippery rigid plastic material, for example polytetrafluoroethylene, is secured by machine screws 29 to the center frame 24.

As shown in FIGURE 1, a first section of the conveyor system 10 extends along a straight line and the second section shown in FIGURE 2 extends along an arc. It is an advantage of this invention that it enables these various conveyor configurations to be utilized conveniently. The conveyor system is suitably mounted as by a support bracket 30'.

In order to rotate each shaft 16, a driven sprocket 32 is secured to the end and is engaged by a toothed belt 33 of the type having a continuous center strand with laterally projecting teeth, as seen at the upper right of FIGURE 1. The driven sprockets 32 have a peripheral groove 35 to fit the toothed belt 33, and along the straight section of the conveyor system there is a hold-down guide element 34 (FIGURE 3) for holding the belt 33 in engagement with the sprockets 32, while the idler sprockets 36 provide tension. On the curved section of the conveyor system the belt 33 is held in engagement with the driven sprockets 32 by means of idler sprockets 37, and along its return it is guided on its side by a track 38 (FIGURE 6) which is adjustable for belt tensioning.

For driving the upstream supply belts 12 and 14, there is a main power input shaft 40 connected to a gear 41 (FIGURE 3) engaging a gear 42 for turning a pulley 43 (FIGURE 1). The drive is then transmitted through a belt 44, pulley 45 and an electrically actuated clutch 46 to the supply belt 12. Similarly the other supply belt 14 is driven from the gear 42 through a shaft 48 (FIGURE 1), pulley 49, belt 50, pulley 51, and an electrically actuated clutch 52. When either side of the duplex conveyor system 10 is fully banked up as far upstream as the next-to-last set of rings, then the clutch 46 or 52 is disengaged momentarily by a photocell sensor (not shown).

The toothed belt 33 for the curved downstream conveyor section is driven by a sprocket 32' (FIGURE 3) concentric with the gear 41, and the drive sprocket 32" for the other belt 33 is driven from the gear 41 by a gear 54.

In order to guide and equally space the first set of rings 18 as shown in FIGURE 1 there is a set of spacers 55 adjacent to the end of the belts 12 and 14. These spacers 55 are fixed in position and extend up with clearance between the peripheries of the rings but they do not touch the articles C. At the downstream end adjacent to the belt 15 there is a small diameter idler transitional roller 56 having circumferential ribs which engage between the rings to guide them and keep them equally spaced.

For steering and propagating the confections along an arcuate path while minimizing contact with the rails 26, 27 or 28, as shown in FIGURE 6, the rings 18–1, 18–2, 18–3 and 18–4 are made progressively larger in their outside diameter (O.D.) toward the outside of the curved path. The inside diameter (I.D.) of all of the rings in this embodiment is the same so that they all revolve at the same rotational speed, but those rings with a larger O.D. provide a faster peripheral speed for propelling the articles C along a curved path. Also, it is possible to use rings of graduated O.D. on the straight section of a conveyor, as shown in FIGURE 1, to steer the confections along a prescribed path which in this case is near the common rail 28 for both sides of the conveyor.

As seen in FIGURE 6 the rings taper inwardly on one side so that contact occurs between the flat surface of one ring and the overlapping portion of the perimeter of the next ring. This aids in making the rings self-cleaning for avoiding build up of food particles or food coatings such as chocolate.

It will be appreciated that an advantage of this invention is that it enables the selection of desired coefficient of friction characteristics for the propagating force. The friction characteristics of the article are given, but the coefficients of rolling and of sliding friction between the ring 18 and shaft 16 can be chosen as desired by selection of materials and by dimensions used. In effect the friction pair which would exist between the article C and conveyor is substituted by a lower friction pair between ring 18 and shaft 16. Also, changing dimensional proportions of the rings can be used to control the line pressure. If desired each ring can be of compound materials, that is with an exterior made of a material compatible with the articles being conveyed lined with a different material which rolls against the shaft to provide the desired rolling and sliding characteristics between shaft and ring. In the present and specific embodiment the rings are formed of rigid slippery plastic, i.e. PTFE resin, and the shafts 16 are stainless steel. Also, the relative mechanical disadvantage at the location of engagement between shaft and ring can be increased by using rings having a greater O.D. to I.D. ratio.

As shown in FIGURE 5, when the confection banks up, the resisting force R causes the shaft to slip, and the sliding friction is less than the rolling friction, thus the forward force being exerted upon each of the banked confections is very small. The problem of accumulated line-pressure is avoided.

A modified embodiment provides a further reduction in forward driving force by positioning the shafts 16 sufficiently close together that the peripheries of the rings just clear the next adjacent shaft. Then, when the confections bank up, the small sliding force between each rotating shaft and ring causes the ring to swing forward so that its exterior touches the next adjacent downstream shaft, which is counter rotating to the upstream shaft engaging the interior of the ring. In FIGURE 5 it is seen that each ring does swing forward somewhat when it is stopped by the banking. When very low coefficients of rolling and sliding friction between the rings and shafts are chosen, as in this specific embodiment, then the conveyor system as a whole may be sloped gently downhill as shown in FIGURE 3.

When the rings 18–1, 18–2, 18–3 and 18–4 are made progressively larger in their O.D., the overlapping rings on the adjacent shafts have intermediate outside diameters to provide an overall progression in size. In this specific example seven different sizes of rings are used. An advantage of the steering action thus obtained is that the articles are kept accurately lined up even though they may be substantially narrower than the spacing between the respective guide rails 26, 28 and 27. Thus, even though the articles have rounded ends, they do not overlap.

By avoiding scuffing or rubbing action the attractive appearance of the articles is maintained, as discussed above, and also the conveyor system itself is correspondingly maintained clean of the material buildup which results from scuffing.

Another modified embodiment uses axially elongated rings 18 such that they have a cylindrical configuration and only one or two of the elongated rings may be utilized on each shaft 16 for conveying the articles. For conveying wide articles, more rings may be used or the elongation of the individual rings may be increased as may be desired for a particular application of this invention.

The terms and expressions which we have employed are used in a descriptive and not in a limiting sense, and we have no intention of excluding such equivalents of the elements described as fall within the scope of the claims.

What is claimed is:

1. A limited line-pressure buffer conveyor system for conveying delicate articles along a path and for accumulating the delicate articles in a temporary bank comprising a support frame, a plurality of friction drive shafts rotatably mounted on the frame, said shafts being spaced apart and extending at right angles to the desired path, a plurality of rings, at least one ring surrounding each of the shafts and having an inside diameter (I.D.) larger than the shaft which the ring surrounds, each ring normally being in rolling engagement with its shaft and being frictionally driven by and slidable upon its shaft, and drive means for rotating the shafts for propagating the delicate articles along upon the rings.

2. A limited line-pressure buffer conveyor system for delicate articles as claimed in claim 1 and wherein a plurality of rings surround each of a plurality of shafts and the rings on adjacent shafts are interleaved in overlapping relationship with those on the adjacent shafts.

3. A limited line-pressure buffer conveyor system for conveying delicate articles as claimed in claim 1 wherein the materials of the shafts and rings provide a low coefficient of sliding friction between each ring and its shaft.

4. A limited line-pressure buffer conveyor system for conveying delicate articles as claimed in claim 1 wherein the outside diameter (O.D.) of the rings is substantially larger than the inside diameter (I.D.) of the rings placing the location of rolling engagement between each of the shafts and the interior of the ring at an effective mechanical disadvantage relative to the location of the engagement between the rings and the articles.

5. A limited line-pressure buffer conveyor system for conveying delicate articles as claimed in claim 1 and wherein there are a plurality of rings on each of a plurality of shafts and the rings on at least one shaft have progressively larger outside diameters along the shaft for providing progressively greater peripheral speeds to steer the articles being propagated thereon.

6. A limited line-pressure buffer conveyor system for conveying delicate articles as claimed in claim 1 and wherein the rings are tapered radially inwardly.

7. A limited line-pressure buffer conveyor system for conveying delicate articles as claimed in claim 1 and in which there are a plurality of rings on each of a plurality of shafts, each of said shafts being spaced apart from the adjacent shafts by a distance greater than the radial distance between the inside diameter (I.D.) and outside diameter (O.D.) of the respective rings, whereby the peripheries of the rings normally clear the rotating surfaces of the adjacent shafts, said rings being capable of swinging forward to touch the rotating surfaces of the adjacent downstream shafts when the rings are stopped from turning by the banking up of the articles thereon.

8. A limited line-pressure buffer conveyor system for conveying delicate articles along a curved path and for accumulating the delicate articles in a temporary bank along said path comprising a support frame, a plurality of friction drive shafts rotatably mounted on the frame, said shafts being spaced apart and extending generally at right angles to said curved path, said shafts being spaced apart more widely toward the outside of said curved path than toward the inside thereof, a plurality of rings surrounding each of a plurality of said shafts and each ring having an inside diameter (I.D.) larger than the shaft which the ring surrounds, each ring normally being in lling engagement with its shaft during operation of the conveyor system and being frictionally driven by its shaft to revolve therearound, the rings being slidable with respect to the shafts, drive means for rotating said friction drive shafts for propagating the delicate articles along said curved path upon the rings, and the peripheral speed of the rings toward the outside of said curved path being higher than the peripheral speed of the rings toward the inside of said curved path for steering the articles along said curved path.

9. A limited line-pressure buffer conveyor system for conveying delicate articles as claimed in claim 8 and wherein the ratio of O.D. to I.D. of the rings progressively increases toward the outside of said curved path for providing a higher peripheral speed.

References Cited

UNITED STATES PATENTS 2,648,122   8/1953   Hornbostel  -------- 198—127

EVON C. BLUNK, *Primary Examiner.*

RICHARD E. AEGERTER, *Assistant Examiner.*